Figures 1, 2:
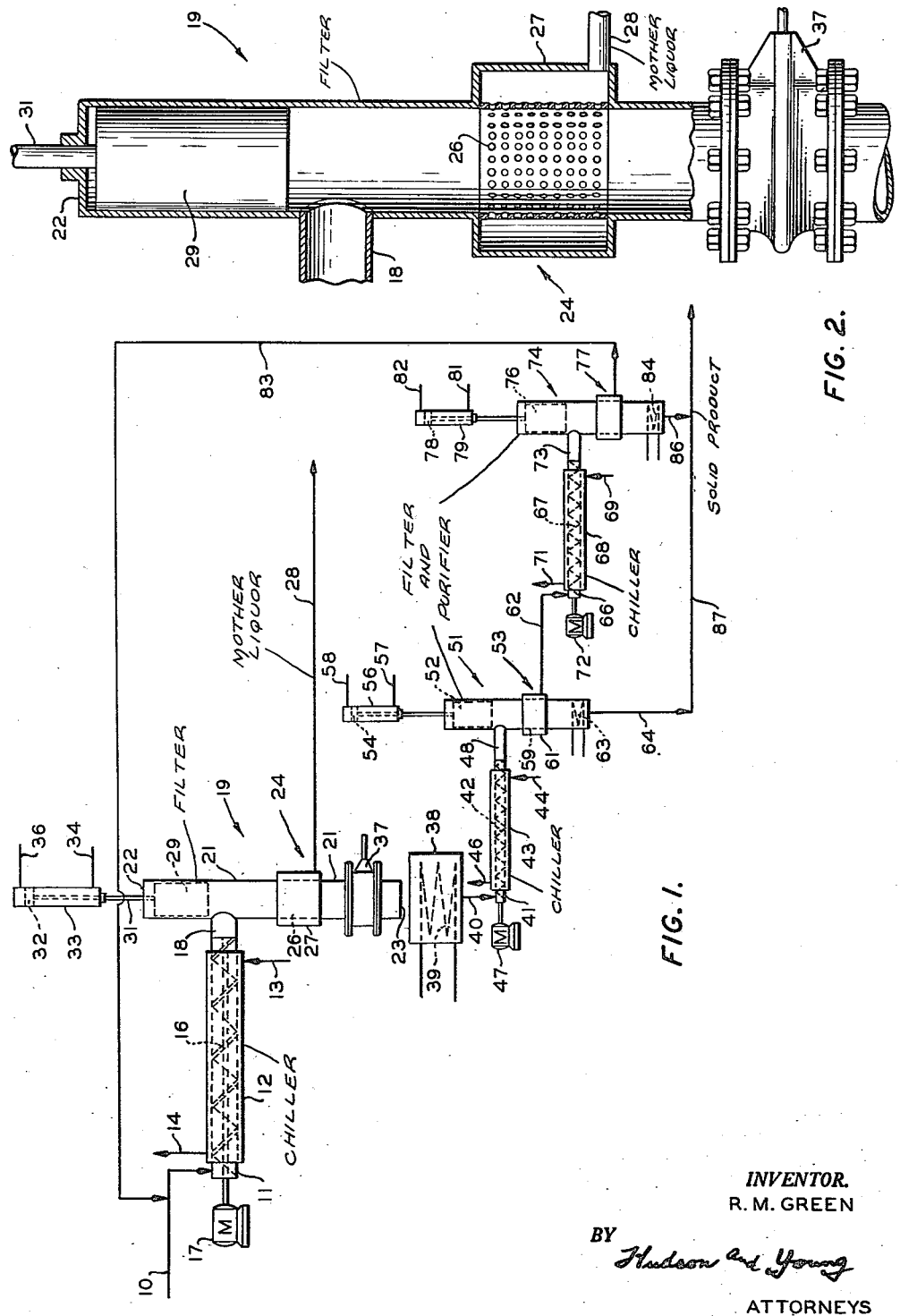

Dec. 3, 1957  R. M. GREEN  2,815,364
FRACTIONAL CRYSTALLIZATION PROCESS AND APPARATUS
Filed Feb. 21, 1955

INVENTOR.
R. M. GREEN
BY Hudson and Young
ATTORNEYS

United States Patent Office 2,815,364
Patented Dec. 3, 1957

2,815,364

FRACTIONAL CRYSTALLIZATION PROCESS AND APPARATUS

Richard M. Green, Borger, Tex., assignor to Phillips Petroleum Company, a corporation of Delaware Application February 21, 1955, Serial No. 489,710

13 Claims. (Cl. 260—475)

This invention relates to the separation and purification of components of liquid multi-component mixtures. In one of its more specific aspects, it relates to the separation and purification of components of a liquid multi-component mixture by fractional crystallization. In another of its more specific aspects, it relates to fractional crystallization apparatus comprising improved means for separating liquid and solid phases from slurries of solids in liquid. In still another of its more specific aspects, it relates to an improved method for separating liquid and solid phases from slurries of solids in liquid. In yet another of its more specific aspects, it relates to a two-stage fractional crystallization process.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may well be the only method which can be advantageously employed.

As well as offering in many cases perhaps the only practicable method of separation, the crystallization method offers the further advantage of being the only separation method which theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurity since the concentration of impurity in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

More recently, a continuous method of separating and purifying liquid multi-component mixtures has been advanced which overcomes the disadvantages of conventional fractional crystallization processes. In one embodiment, this method involves cooling a liquid component mixture from which the separation is to be made so as to form crystals of at least the higher melting component and thereafter separating crystals from mother liquor. The crystals are then introduced into a purification section in one end of which a melting zone is maintained. The crystals are moved through the purification section toward the melting zone where the crystals are melted, and a portion of the melt is withdrawn as product. The remainder of the melt is displaced as a reflux stream countercurrently to the movement of the crystals and in intimate contact therewith so as to remove occluded impurities.

When practicing a fractional crystallization process as described hereinabove, the high purity of product obtainable is believed to be due at least in part to the action of the reflux stream in contacting the crystals. It is believed that the reflux stream refreezes upon the crystals moving toward the melting zone, thereby displacing occluded impurities. A stream comprising displaced impurities is thereafter removed from the purification section upstream, with respect to crystal movement, of the melting zone.

The reflux stream in refreezing upon the crystals gives up heat which raises the temperature of the crystals in the warm end of the crystal bed. This is the major source of heat for raising the temperature of the crystals to their melting point. If the difference between the inlet temperature and the crystal melting point increases, it becomes necessary to increase the amount of reflux liquid in order to supply the required amount of heat. The refreezing of an increasing amount of reflux liquid may in some cases cause the warm end of the crystal bed to become so dense that difficulty is encountered in flowing the required reflux liquid into the crystal bed. Furthermore, the crystal bed may, in some instances, become so dense as to finally result in plugging of the purification section.

When separating the components of some mixtures by fractional crystallization, it is necessary in order to obtain the desired crystal formation to cool the mixtures to a temperature far below that at which crystals of any one of the pure components form. Accordingly, in separating para-xylene from certain mixtures of isomeric $C_8$ alkylbenzenes, it may be necessary to cool the mixtures to a temperature between about —70° F. and —110° F. For example, with a certain mixture of isomeric $C_8$ alkylbenzenes containing about 17 weight percent para-xylene, it is necessary to cool the mixture to about —105° F. in order to obtain the desired formation of para-xylene crystals. Operation at higher temperatures with such a feed mixture results in an excessive proportion of the para-xylene remaining in the mother liquor. Pure para-xylene on the other hand has a freezing point of about 56° F.

From the discussion above of the fractional crystallization process, it is apparent that unfavorable operating conditions would prevail if a crystal slurry having a temperature too much lower than the melting point of the component to be purified were to be introduced directly into the purification section. It has been found that satisfactory results can be obtained if mother liquor is first separated from the slurry in a prefilter after which at least a portion of the crystals is melted. The resulting melted material is then cooled to a temperature considerably higher than that of the original crystallization, but which is still low enough to result in the formation of crystals of a component of a mixture. The crystal slurry so formed is then introduced into the purification section at a temperature which is not so low as to cause excessive freezing of reflux in the column. Rotary vacuum filters or centrifuges, either continuous or cyclic, have been used as prefilters to separate mother liquor from the low temperature crystal slurry. In accordance with this invention, an improved prefiltering means is provided which makes possible an improved efficiency of preliminary filtration as compared to vacuum filters or centrifuges.

The following are objects of the invention.

It is an object of the invention to provide improved fractional crystallization apparatus.

Another object of the invention is to provide an improved process for the separation and purification of components of multi-component mixtures.

Still another object of the invention is to provide a two-stage fractional crystallization process which permits a reduction in the over-all refrigeration requirements of the system.

A further object of the invention is to provide an improved method for separating a component having a relatively high melting point from a liquid mixture which has a relatively low eutectic freezing point.

A still further object of the invention is to provide an improved filter for the separation of liquid and solid phases from low concentrations of solids in liquid.

Still other objects and advantages of the invention will become apparent to those skilled in the art upon study of the accompanying disclosure.

Broadly speaking, the present invention resides in an improved means and method for separating liquid from slurries of solids in liquid so as to obtain a filter cake or plug, containing a high percentage of solids. In accordance with a broad aspect, the invention comprises introducing a slurry of solids, especially crystals, in liquid, especially mother liquor, into an elongated, open-ended chamber having a filter zone in an intermediate portion thereof, and compacting the crystals within the chamber so as to separate mother liquor from the crystals. The mother liquor is removed from the chamber through the filter zone while the compacted crystals are moved slowly through the chamber by the pressure applied to compact the crystals and discharged from the open end of the chamber. It has been found that after the initial formation of a compact crystal mass within the chamber, the wall friction alone is sufficient to maintain a crystal plug therein, and it is unnecessary to provide an obstruction in the downstream end of the chamber. In other words, the wall friction provides sufficient resistance to flow so that a relatively high pressure can be applied to the crystals so as to squeeze out a large proportion of the mother liquor without causing the entire crystal bed to fall out of the chamber even though disposed in a vertical position with its open end downward.

In one specific embodiment, the invention resides in a two-stage crystallization process in which at least a portion of the crystals recovered from the filter chamber as described above are melted and then refrozen at a temperature substantially higher than the initial temperature of crystallization. The crystal slurry so formed is then introduced into a first separation and purification column in which mother liquor is separated from the crystals so as to form a crystal mass therein. Since the mother liquor stream is relatively rich in the component to be separated, it has been found that a saving in over-all refrigeration requirements can be effected by utilizing this stream as the feed for a second separation and purification column. Accordingly, the mother liquor is cooled to a temperature lower than the second crystallization temperature but which is still considerably higher than the initial temperature of crystallization. The resulting crystal slurry is then passed into the second separation and purification column in which mother liquor is separated from the crystals so as to form a mass of crystals therein. The mother liquor recovered from the second separation and purification column is recycled to the initial crystallization step. A purified product is recovered from the first and second separation and purification columns as will be described hereinbelow.

Although the present invention is particularly applicable to low temperature systems in which the temperature at which crystals form of the desired pure component is substantially higher than the temperature to which the component is cooled in the liquid mixture to form crystals thereof, the process described herein can be advantageously employed in conjunction with practically any system to which fractional crystallization is applicable in order to increase the efficiency of the separation. Thus, the process and apparatus of this invention are applicable to a vast number of simple binary and complex multi-component systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. One particular advantageous application of the process lies in the purification of a component of, for example, 15 to 25 percent purity so as to effect a purity of 98 percent or higher. In order to illustrate some of the systems to which the invention is applicable, the following compounds are grouped with respect to their boiling points:

| | B. P., °C. | F. P., °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-trimethylpentane (isooctane) | 99.3 | −107.4 |
| Nitromethane | 101 | −29 |
| p-Dioxane | 101.5 | 11.7 |
| 2-pentanone | 101.7 | −77.8 |
| 2-methyl-2-butanol | 101.8 | −11.9 |
| 2,3-dimethylpentane | 89.4 | |
| 3-ethylpentane | 93.3 | −94.5 |
| Group C: | | |
| Toluene | 110.8 | −95 |
| Methylcyclohexane | 100.3 | −126.3 |
| 2,2,3,3-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-3-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| CS₂ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | <−25 |
| Para-cymene | 176.0 | −73.5 |
| Group H: | | |
| Dimethyl phthalate | 282 | 5.5 |
| Dimethyl isophthalate | [1] 124 | 67 |
| Dimethyl terephthalate | 288 | 140.6 |
| Group I: | | |
| Ortho-nitrotoluene | 222.3 | α−10.6 β−4.1 |
| Meta-nitrotoluene | 231 | 15.5 |
| Para-nitrotoluene | 238 | 51.3 |

[1] 12 mm.

Mixtures consisting of any combination of two or more of the components within any one of the groups can be resolved by the process of the invention, as can mixtures made up of components selected from different groups; for example, benzene can be separated from a benzene-n-hexane or a benzene-n-heptane mixture in which the benzene is present in an amount greater than the eutectic concentration. In the same manner, para-xylene may be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, 2,2,3-trimethylbutane, methyl cyclohexane, 2,2,4-trimethylpentane, and mixtures of at least two of carbon tetrachloride, chloroform, and acetone. The invention is also applicable to the separation of individual components from a system of cymenes.

This invention can also be utilized to purify naphthalene, hydroquinone, (1,4-benzenediol), paracresol, paradichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics. In cases where the material to be purified has a relatively high crystallization point, the impure material is raised to a temperature at which only a portion of the mixture is in a crystalline state, and the resulting slurry is handled at such a temperature that operation is as described in connection with materials which crystallize at lower temperatures.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the amount of liquid passed as reflux into the moving mass of crystals. This aspect of this invention is in general applicable in those instances where it is desired to increase the concentration of a solution by removing at least a portion of the solvent therefrom.

For a more complete understanding of the invention, reference may be had to the following description and the drawing, in which:

Figure 1 is an elevational view of fractional crystallization apparatus illustrating the invention; and Figure 2 is an elevational view, partly in section, of the piston-driven pressure filter of Figure 1.

Referring now to Figure 1 of the drawing, a mixture of materials from which at least one component is to be separated is supplied through conduit 10 to a heat exchanger, such as chiller 11, where the temperature of the mixture is adjusted so as to obtain crystals of at least portion of at least one of the components of the mixture. Chiller 11 may be any conventional type chiller, preferably being of the scraped surface type having refrigeration means which are adequate to lower the temperature of the liquid mixture to that necessary to crystallize at least a portion of at least one of the components thereof.

As shown in the drawing, chiller 11 may be provided with a heat exchange jacket 12 having lines 13 and 14 connected thereto for circulating a heat exchange fluid or refrigerant, such as expanding liquid propane, through the jacket. Scraper 16, which is rotated by motor 17, is preferably formed as a helix in order to assist in advancing crystals through the chiller. The chiller may be disposed at an angle in order that the crystals may flow therethrough by means of gravity. Since crystals of the various materials form at different temperatures and since the temperature at which crystals of a given component of a mixture form in the mixture is dependent upon the composition of the mixture, the temperature to which the mixture is adjusted in the chiller depends entirely upon the particular mixture utilized as a feed.

The slurry of crystals in mother liquor formed within chiller 11 is fed through inlet conduit 18 into filter 19 which serves as the prefilter. Filter 19 comprises an elongated chamber or column 21 closed at one end by closure member 22 and open at its opposite end 23. A filter section 24 comprising a filter medium such as a filter screen 26 surrounded by a jacket 27 is provided in an intermediate portion of the chamber downstream, with respect to crystal movement, of the opening into the chamber of inlet conduit 18. Line 28 is connected to jacket 27 for removal of liquid from the filter section. A crystal compacting means such as impervious piston 29 disposed in the closed end portion of the chamber is connected by connecting rod 31 to hydraulic piston 32 in hydraulic cylinder 33. Lines 34 and 36 serve to pass hydraulic fluid alternately into and out of hydraulic cylinder 33 so as to drive hydraulic piston 32 which in turn causes the movement of piston 29. Piston 29 is of such a length that at the end of its compression or downward stroke it completely blocks the entrance of inlet conduit 18 into the chamber. Accordingly, crystal slurry can be introduced into chamber 19 only during the latter part of the backstroke and during the initial part of the compression stroke of piston 29. At the end of the compression stroke of piston 29, the face of the piston preferably extends at least up to the middle of filter section 24. It is to be understood, however, that in some cases the piston may not extend this far into the chamber. A valve such as gate valve 37 having an equal or larger inside diameter than the column is disposed near the open end of the column.

A clearer understanding of the construction of filter 19 can be obtained by referring to Figure 2 of the drawing. Identical reference numerals have been utilized to designate the elements which correspond to those described in conjunction with Figure 1.

When the slurry of crystals and mother liquor is initially introduced into chamber 19 through inlet conduit 18, gate valve 37 is maintained in a closed, or at least a partially closed, position. By so positioning the gate valve, the thin slurry is prevented from flowing through the chamber before a compact mass of crystals or a crystal plug has been allowed to form therein. As piston 29 moves through the chamber on its compression stroke, it compacts the crystals, squeezing out mother liquor and forming a compact mass of crystals in the chamber. Mother liquor is removed from the chamber through filter section 24 by means of line 28. After the formation of the crystal plug, the filter is in most cases operated with gate valve 37 in a completely open position. It has been found that wall friction alone is sufficient to maintain a crystal plug in the chamber after its initial formation therein and that it is unnecessary to maintain a restriction in the chamber in order to offer resistance to the movement of piston 29. The operation of the filter is thereby greatly simplified while at the same time apparently as a result of the compacting action of the filter piston it has been found that an improved efficiency of liquid-solids separation can be obtained. Thus, the crystal bed or plug formed in the chamber contains a high percentage of solids, or to state the proposition in another manner, the crystal bed has a higher purity than is obtainable with conventional filters. This condition makes it feasible to operate, as described hereinafter, with two crystal purification columns. Furthermore, a high filter rate is obtained through the action of the filter piston on its backstroke in wiping the filter screen clean of crystals which may have become embedded therein during the compression stroke of the piston.

There exists for a particular filter an optimum hydraulic drive pressure at which it is preferred to operate in order to maintain a crystal bed or plug having a density such that it will not fall out of the filter chamber when operating without a restriction therein. In general, it is preferred to operate the filter so as to compress the crystals into a crystal bed having a hard rather than a soft consistency. It is to be understood, however, that the filter may be operated with a soft crystal bed, although it may be necessary with such a bed to partially close gate valve 37 in order to avoid loss of the bed. It has been found that the percent of solids contained in the crystal bed increases with an increase in the hydraulic drive pressure and that the filter throughput decreases somewhat with an increase in the pressure because of increased wall friction. It is desirable, therefore, to utilize as high a hydraulic drive pressure as is compatible with a desired filter throughput so as to obtain a crystal bed containing as high a percent of solids as possible. More specifically, the hydraulic drive pressure generally varies between about 100 and 1000 p. s. i. and higher depending upon the size of the filter chamber. For example, when utilizing a filter having a 4" diameter filter chamber, it has been found that the filter operates satisfactorily without a restriction at a hydraulic drive pressure of about 400 p. s. i. g.

While, as noted above, gate valve 27 normally remains in an open position after the initial formation of the crystal plug, in some instances it may be desirable to operate the filter with the valve in a partially closed position. Accordingly, if for some reason the crystal plug should be lost during the filtering operation, the valve provides means for preventing excessive and hazardous flow of slurry through the chamber. Furthermore, the filter can be operated with a partially closed valve if it is desired to control the rate at which crystals are extruded from the chamber. It is also within the scope of the invention to increase the rate of movement of the crystal plug through the chamber by supplying a controlled amount of heat to the chamber walls in order to provide for lubrication between the crystal plug and the chamber walls. Thus, chamber 19 below filter section 24 may be provided with a heat exchange jacket through which a heat exchange medium is circulated so as to provide for the heating of the chamber walls.

While piston 29 has been described as an impervious piston, it is within the contemplation of the invention to utilize a piston provided with a porous face which permits the passage of liquid only therethrough. Such a porous piston serves as a filtering means as well as a crystal compacting means. When operating the filter with a porous piston, the upstream end of the chamber is provided with an outlet line for removal of mother liquor from the chamber.

The compact mass of crystals formed within chamber 19 is moved through the chamber as a result of the pressure exerted thereon by piston 29 during its compression stroke. The crystals on reaching the open end of the column fall into tank or container 38 provided with a heating means such as coil 39 through which a heat exchange medium is circulated. The heating means maintains the tank at a temperature sufficiently high to melt at least a major proportion of the crystals.

The resulting melt or mixture of melt and crystals is passed from tank 38 through conduit 40 into chiller 41. Chiller 41 is provided with a scraper 42 and refrigeration means such as jacket 43 having inlet and outlet lines 44 and 46 connected thereto. Motor 47 serves to rotate scraper 42 within the chiller. The material introduced into the chiller is cooled therein to a temperature low enough to form crystals of the component to be purified by circulating a refrigerant through the jacket. This temperature is in general considerably higher than the initial crystallization temperature, but will depend for any given component upon the composition of the material.

The crystal slurry formed in chiller 41 is introduced through conduit 48 into an upstream portion of closed separation and purification column 51. After entering the column, the slurry is moved downwardly therethrough by means of piston 52 into filter section 53. Piston 52 is forced downwardly and upwardly by means of hydraulic piston 54 which is moved in response to a hydraulic fluid introduced into and withdrawn from hydraulic cylinder 56 through lines 57 and 58. Piston 52 is so constructed that introduction of material into the column is possible only when the lower end of the piston is above the open end of slurry inlet conduit 48. By operating in the described manner, piston 52 on its compression stroke forces crystals downwardly through column 10 while on the latter part of its backstroke and the initial part of its compression stroke crystal slurry is allowed to pass into the column through inlet conduit 48.

Within filter section 53 mother liquor is separated from the crystals by passing same through filter screen 59 surrounded by jacket 61. The mother liquor is removed from the column through line 62 and then passed into a second fractional crystallization stage as will be described more in detail hereinafter. After the separation of the mother liquor, the crystals continue their movement downwardly through the column as a result of the force exerted by piston 52. Crystals on approaching the end of column 51 enter the melting zone maintained in the end of the column by heating means 63. The heating means is illustrated as being a heating coil through which a heat transfer medium is circulated, but it is not intended to limit the invention to the specific heating means shown, for other suitable means may be employed. For example, an electrical heater may be positioned next to the lower closure member of the column, a coil may be disposed around the column at its lower end, or an electrical bayonet type heater may be provided to extend into the end of the column. The melting zone is maintained by the heating means at a temperature at least as high as the melting point of the crystals. On reaching the melting zone, at least a portion of the crystals is melted, and a portion of the resulting melt is displaced upwardly as a reflux stream into the downwardly moving mass of crystals. The reflux stream on contacting the crystals upstream crystalwise of the melting zone displaces occluded impurities of the crystals by refreezing thereon. A liquid stream comprising displaced impurities is removed from column 51 with the mother liquor through filter section 53 by means of line 62. A substantially pure product in the form of melt or a mixture of melt and crystals is withdrawn from the melting zone through line 64.

While piston 52 has been described as an impervious piston, it is within the scope of the invention to utilize a piston having a porous face which permits the passage of liquid therethrough while preventing the flow of crystals. When operating the separation and purification column with a porous piston, an outlet line is provided in the upper end of the column for the removal of mother liquor from the column. The mother liquor removed from the column through this line would be passed to the second fractional crystallization stage as will be described hereinbelow. The use of a porous piston has the advantage of providing additional filter surface for the separation of mother liquor from the crystal slurry, and such a piston can be advantageously utilized where the wall filter alone does not provide sufficient filter surface for effecting this separation.

It has been found that the mother liquor removed from the filter section of separation and purification column 51 through line 62 is in many cases sufficiently rich in the component to be purified to justify the utilization of this stream as the feed for a second separation and purification column. This results from the fact that because of the removal of a large proportion of the mother liquor in the prefilter, the feed to the first separation and purification column is comparatively rich in the component to be purified. Accordingly, the mother liquor removed from column 51 is passed through line 62 into chiller 66. Chiller 66, which is constructed similar to those previously described, is provided with a scraper 67 and refrigeration means such as a jacket 68. Inlet and outlet lines 69 and 71 are connected to jacket 68 in order to provide means for circulating a refrigerant through the jacket while motor 72 provides means for rotating scraper 67 within chiller 66.

The material introduced into chiller 66 is cooled therein to a temperature low enough to form crystals of the component to be purified. This temperature is in general somewhat lower than the temperature maintained during the second crystallization in chiller 41 but is still considerably higher than the initial crystallization temperature. Since the temperature maintained in chiller 66 is considerably higher than the original crystallization temperature, i. e., the temperature maintained within chiller 11, a reduction in over-all refrigeration requirements is effected by separately treating the mother liquor recovered from the first purification column rather than recycling it to the initial cooling step.

The crystal slurry formed in chiller 66 is introduced through conduit 73 into the upstream portion of closed separation and purification column 74 which is similar to separation and purification column 51. The slurry after entering the column is moved downwardly therethrough by means of piston 76 into filter section 77. Piston 76 is forced downwardly and upwardly by means of hydraulic piston 78 which is moved in response to a hydraulic fluid introduced into and withdrawn from hydraulic cylinder 79 through lines 81 and 82. Within filter section 77 mother liquor is separated from the crystals and removed from the column through line 83. The mother liquor removed through line 83 is recycled to feed inlet line 10 wherein it is mixed with the feed mixture prior to introduction into chiller 11. If desired, all or a portion of the material in line 83 may be removed as a product of the process. After removal of the mother liquor, the crystals continue their movement as a uniform mass downwardly through the column as a result of the force exerted thereon by piston 76. Crystals on approaching the end of column 74 enter the melting zone maintained in the end of the column by heating means 84. The melting zone is maintained at a temperature at least as high as the melting point of the crystals by continuously circulating a heat exchange medium through the coil of the heating means. On reaching the melting zone, at least a portion of the crystals is melted, and a portion of the resulting melt is displaced upwardly as a reflux stream into the downwardly moving mass of crystals. The reflux stream on contacting the crystals displaces occluded impurities from the crystals, apparently by refreezing thereon, and a liquid stream comprising displaced impurities is removed from the column through filter section 77 along with the mother liquor. A substantially pure product in the form of melt or a mixture of melt and crystals is withdrawn from the melting zone through line 86. The product is then combined in line 87 with the pure product removed from separation and purification column 57 through line 64.

While the fractional crystallization apparatus has been described herein for the sake of clarity of understanding as occupying a substantially vertical position, it is not intended to so limit the invention. It is to be understood that the apparatus can be otherwise disposed without departing from the spirit or scope of the invention. Thus, the filter or the separation and purification columns can be positioned horizontally rather than vertically as shown. Furthermore, the separation and purification columns can be operated vertically with the melting zone in the top of the column rather than in the bottom as illustrated. While the invention has been described in conjunction with separation and purification columns which utilize a piston as a crystal mover, the invention is not limited to any specific column, but rather, can be used in conjunction with any purification column which utilizes a displaced reflux stream to obtain a high purity product. Although the improved filtering means of the invention has been described as it is utilized in a two-stage crystallization process, it is to be understood that the filter can be advantageously employed with a single separation and purification column. Still again, while the invention is particularly applicable to low temperature systems in which a large temperature differential exists between the temperature to which the component to be purified is cooled in the liquid mixture to form crystals thereof and the freezing point of the pure component, it is not intended to limit the invention to any specific system. Thus, the process of this invention can be advantageously used with any system to which fractional crystallization is applicable.

A more comprehensive understanding of the invention may be obtained by reference to the following illustrative examples which are not intended, however, to be unduly limitative of the invention.

EXAMPLE I

A feed material comprising 65.5 weight percent para-xylene, the impurities being chiefly ortho- and meta-xylene and ethyl benzene, was charged to a chiller wherein it was cooled to a temperature of 10° F. The resulting crystal slurry containing 30.6 percent solids was introduced at a rate of 31.5 gallons per hour into a piston-driven pressure filter similar to that shown in Figure 2 and having a 4-inch diameter filter chamber. Mother liquor containing 51 weight percent para-xylene was withdrawn from the filter section of the filter at the rate of 18 gallons per hour. The hydraulic drive pressure was 400 p. s. i. g., and the consistency of the crystal bed in the filter was hard. The crystal plug extruded from the open end of the filter contained about 75 percent solids and had a para-xylene content of 88 weight percent.

EXAMPLE II

A feed material comprising 62.5 weight percent para-xylene, the impurities being chiefly ortho- and meta-xylene and ethyl benzene, was charged to a chiller wherein it was cooled to a temperature of 4° F. The resulting crystal slurry containing 31 percent solids was introduced at a rate of 30.6 gallons per hour into a piston-driven pressure filter similar to that shown in Figure 2 and having a 4-inch diameter filter chamber. Mother liquor containing 46 weight percent para-xylene was withdrawn from the filter section of the filter at the rate of 18.5 gallons per hour. The hydraulic drive pressure was 400 p. s. i. g., and the consistency of the crystal bed in the filter was hard. The crystal plug extruded from the open end of the filter contained about 74 percent solids and had a para-xylene content of 86 weight percent.

EXAMPLE III

A feed material comprising 60.5 weight percent para-xylene, the impurities being chiefly ortho- and meta-xylene and ethyl benzene, was charged to a chiller wherein it was cooled to a temperature of 1° F. The resulting crystal slurry containing 30 percent solids was introduced at a rate of 29.7 gallons per hour into a piston-driven pressure filter similar to that shown in Figure 2 and having a 4-inch diameter filter chamber. Mother liquor containing 43.5 weight percent para-xylene was withdrawn from the filter section of the filter at the rate of 19.3 gallons per hour. The hydraulic drive pressure was 400 p. s. i. g., and the consistency of the crystal bed in the filter was hard. The crystal plug extruded from the open end of the filter contained about 75 percent solids and had a para-xylene content of 86 weight percent.

EXAMPLE IV

A feed material comprising 84.5 weight percent para-xylene, the impurities being chiefly ortho- and meta-xylene and ethyl benzene, was charged to a chiller wherein it was cooled to a temperature of 41° F. The resulting crystal slurry containing 20.3 percent solids was introduced at a rate of 30.3 gallons per hour into a piston-driven pressure filter similar to that shown in Figure 2 and having a 4-inch diameter filter chamber. Mother liquor containing 81.3 weight percent para-xylene was withdrawn from the filter section of the filter at the rate of 24.5 gallons per hour. The hydraulic drive pressure was 400 p. s. i. g., and the consistency of the crystal bed in the filter was hard. The crystal plug extruded from the open end of the filter contained about 80.4 percent solids and had a para-xylene content of 97.4 weight percent.

EXAMPLE V

A feed material comprising 44 weight percent para-xylene, the impurities being chiefly ortho- and meta-xylene and ethyl benzene, was charged to a chiller wherein it was cooled to a temperature of −40° F. The resulting crystal slurry containing 28.5 percent solids was introduced at a rate of 24.0 gallons per hour into a piston-driven pressure filter similar to that shown in Figure 2 and having a 4-inch diameter filter chamber. Mother liquor containing 24.5 weight percent para-xylene was withdrawn from the filter section of the filter at a rate of 17.6 gallons per hour. The hydraulic drive pressure was 400 p. s. i. g., and the consistency of the crystal bed in the filter was soft. The crystal plug, which was shaved by operating with the gate valve protruding 3/8" to 1/4" into the filter column, contained about 63.3 percent solids and had a para-xylene content of 74.4 weight percent.

An examination of the foregoing examples indicates that with feed materials comprising between 44 and 84.5 weight percent para-xylene, crystal beds were formed which had a para-xylene content of between about 74 and 97 weight percent.

EXAMPLE VI

In order to observe the effect of varying hydraulic drive pressure, a feed material comprising between 38 and 42 weight percent para-xylene, the impurities being chiefly ortho- and metal-xylene and ethyl benzene, was charged to a chiller wherein it was cooled so as to form a slurry of para-xylene crystals in mother liquor. The crystal slurry was then fed to a piston-driven pressure filter having a 4-inch diameter chamber, similar to that shown in Figure 2. The hydraulic drive pressure was varied from 100 to 400 p. s. i. g., and the data obtained are indicated in the following table:

Table

| Time | Hydraulic drive pressure, p. s. i. g. | Stream p-xylene content, mol percent* | | | Bed temp., °F. | Est. product rate, g. p. h. | Percent solids in bed | | | Remarks |
| --- | --- | --- | --- | --- | --- | --- | --- | --- | --- | --- |
| | | Feed | Mother liquor | Bed | | | (1) | (2) | Avg. | |
| 9:35 a. m. | 100 | 41 | 25.6 | 69.5 | −26 | 3 | 59 | 58 | 58 | Operation extremely unstable, the startup bed was retained with the 4-inch gate valve 1/8 closed. Bed was soft. |
| 10:05 a. m. | 100 | 41 | 20.3 | 69.0 | −30 | | 61 | 58 | 60 | |
| 10:35 a. m. | 200 | 38 | 22.3 | 76.0 | −11 | | 69 | 63 | 66 | Operation unstable, the startup bed was retained with the 4-inch gate valve 1/4 closed. The bed moved very slowly. Bed was soft. |
| 11:05 a. m. | 200 | 38 | 19.5 | 69.5 | −35 | | 62 | 60 | 61 | |
| 11:30 a. m. | 200 | 40 | 20.0 | 73.0 | −40 | 5 | 66 | 66 | 66 | |
| 12:30 p. m. | 200 | 40 | 19.5 | 71.7 | −37 | 2 | 65 | 63 | 64 | |
| 1:00 p. m. | 300 | 42 | 18.0 | 73.0 | −30 | 2 | 67 | 63 | 65 | Operation moderately stable. Valve wide open, bed moved very slowly. Bed was firm. |
| 2:15 p. m. | 300 | 41 | 25.6 | 75.0 | −20 | 1 | 66 | 64 | 65 | |
| 3:00 p. m. | 400 | 40 | 19.6 | 79.5 | −10 | 1½ | 75 | 68 | 72 | Operation quite stable. Valve wide open. Fairly hard bed. Bed moved slowly. |
| 3:30 p. m. | 400 | 41 | 24.0 | 80.7 | −22 | 2 | 75 | 73 | 74 | |

*From plant freezing points.
(1) Calculated by material balance, assuming liquid phase in the bed is of mother liquor composition.
(2) Calculated from temperature, composition, and phase equilibrium data.

An examination of the data in the above table indicates that the 38 to 42 percent para-xylene feeds produced crystal beds containing 58 to 75 percent solids depending on the hydraulic drive pressure.

EXAMPLE VII

A feed material comprising about 16 weight percent para-xylene, the impurities being chiefly ortho- and meta-xylene and ethyl benzene, is charged to the chiller of fractional crystallization apparatus similar to that of Figure 1 at a rate of 833 gallons per hour. A mother liquor stream separated in the second stage separation and purification column and containing 32 weight percent para-xylene is recycled to the feed inlet line of the chiller at a rate of 50 gallons per hour with the result that a total feed containing 16.9 weight percent para-xylene is charged to the chiller at a rate of 883 gallons per hour. The feed material is cooled in the chiller to a temperature of −105 F., causing para-xylene to crystallize and form a slurry. The slurry is introduced into the piston-driven pressure filter where mother liquor containing about 6 weight percent para-xylene is separated from the slurry at a rate of 743 gallons per hour. The crystals extruded from the open end of the filter as a result of the force exerted thereon by the filter piston are melted in a container, and the resulting melt containing 75 weight percent para-xylene is fed to a chiller wherein it is cooled to a temperature of 20 F. The resulting slurry of para-xylene crystals in mother liquor is then passed into the first stage separation and purification column. The slurry is moved through the column by means of a piston into the filter section where mother liquor containing 58 weight percent para-xylene is recovered at a rate of 84 gallons per hour. The mass of crystals as a result of the force exerted thereon by the column piston moves through the column toward the melting zone maintained in the end of the column at a temperature above the melting point of the para-xylene crystals. A stream containing 98 weight percent para-xylene is withdrawn from the melting zone at a rate of 56 gallons per hour as a product of the process. The mother liquor containing 58 weight percent para-xylene recovered from the filter section of the first stage separation and purification column is charged to a chiller wherein it is cooled to −19 F. The resulting slurry of para-xylene crystals in mother liquor is then passed into the second stage separation and purification column. The slurry is moved through the column by means of a piston into the filter section where mother liquor containing 32 weight percent para-xylene is recovered at a rate of 50 gallons per hour. This stream, as previously mentioned, is recycled to the feed inlet line to the initial chiller. The mass of crystals as a result of the force exerted thereon by the column piston moves through the second stage separation and purification column toward the melting zone maintained in the end of the column at a temperature above the melting point of the para-xylene crystals. A stream containing 98 weight percent para-xylene is withdrawn from the melting zone at a rate of 34 gallons per hour as a product of the process.

It will be apparent to those skilled in the art that various modifications of the invention can be made upon study of the accompanying disclosure. Such modifications are believed to be clearly within the spirit and scope of the invention.

I claim:

1. A process for separating liquid from slurries of solids in liquid which comprises introducing a slurry of solids in liquid into an unrestricted elongated filter zone, said zone being normally open at its discharge end; initially obstructing the discharge end of said filter zone so as to prevent said slurry from flowing through the open end of said zone; compressing said slurry within said filter zone so as to squeeze out liquid and form a compact mass of solids of uniform cross-section therein; removing liquid from said filter zone; removing the obstruction from the discharge end of said filter zone; slowly moving said compact mass of solids of uniform cross-section through said filter zone so that said solids are extruded through the open end of said filter zone; and recovering said extruded solids.

2. A process for separating mother liquor from slurries of crystals in mother liquor which comprises introducing a slurry of crystals in mother liquor into an unrestricted elongated filter zone, said zone being normally open at its discharge end; initially obstructing the discharge end of said filter zone so as to prevent said slurry from flowing through the open end of said zone; compressing said slurry within said filter zone so as to squeeze out mother liquor and form a compact mass of crystals of uniform cross-section therein which offers substantial resistance to movement through said zone; removing mother liquor from said filter zone; removing the obstruction from the discharge end of said filter zone; continuing alternately to introduce said slurry into said filter zone and to compress said slurry so as to squeeze out mother liquor; continuing to remove mother liquor from said filter zone; moving said compact mass of crystals of uniform cross-section through said filter zone and extruding same from the discharge end of said filter zone as a result of compressing same within said zone; and recovering said extruded crystals.

3. A process for the purification of crystals which comprises introducing a slurry of said crystals in mother liquor into an unrestricted elongated filter zone, said zone being normally open at its discharge end; initially obstructing the discharge end of said filter zone so as to prevent said slurry from flowing through the open end of said zone; compressing said slurry within said filter zone so as to squeeze out mother liquor and form a compact mass of crystals of uniform cross-section therein; removing mother liquor from said filter zone; slowly moving said compact mass of crystals of uniform cross-section through said filter zone so that said crystals are extruded through the open end of said filter zone; recovering said crystals and melting at least a substantial portion thereof in a melting zone removing the obstruction from the discharge end of said filter zone; cooling the resulting melt to a temperature such as to form a slurry of said crystals in mother liquor, said temperature being higher than the temperature of said first mentioned crystal slurry; removing occluded impurities from said crystals formed at said higher temperature; and recovering a purified product.

4. A process for separating a component from a liquid multicomponent mixture, said component forming crystals upon the cooling of said mixture, which comprises introducing a slurry of said crystals in mother liquor into an unrestricted elongated filter zone, said zone being normally open at its discharge end; initially obstructing the discharge end of said filter zone so as to prevent said slurry from flowing through the open end of said zone; compressing said slurry within said filter zone so as to squeeze out mother liquor and form a compact mass of crystals of uniform cross-section therein which offers substantial resistance to movement through said zone; removing mother liquor from said filter zone; removing the obstruction from the discharge end of said filter zone; continuing alternately to introduce said crystal slurry into said filter zone and to compress said slurry so as to squeeze out mother liquor; continuing to remove mother liquor from said filter zone; moving said compact mass of crystals of uniform cross-section through said filter zone and extruding same from the discharge end of said zone as a result of compressing same within said zone; recovering said crystals and melting at least a substantial portion thereof in a melting zone; cooling the resulting melt to a temperature such as to form a slurry of said crystals in mother liquor, said temperature being substantially higher than the temperature of said first mentioned crystal slurry; removing occluded impurities from said crystals formed at said higher temperature; and recovering a purified product.

5. The process of claim 4 wherein said mixture comprises para- and meta-xylenes.

6. The process of claim 4 wherein said mixture comprises dimethyl isophthalate and dimethyl terephthalate.

7. The process of claim 4 wherein said mixture comprises para- and meta-cymenes.

8. The process of claim 4 wherein said mixture comprises para- and meta-nitrotoluenes.

9. The process of claim 4 wherein said mixture comprises cyclohexane and 2,2-dimethylpentane.

10. A process for the purification of crystals which comprises introducing a slurry of said crystals in mother liquor into an unrestricted elongated filter zone, said zone being normally open at its discharge end; initially obstructing the discharge end of said filter zone so as to prevent said slurry from flowing to the open end of said zone; compressing said slurry within said filter zone so as to squeeze out mother liquor and form a compact mass of crystals of uniform cross-section therein; removing mother liquor from said filter zone; removing the obstruction from the discharge end of said filter zone; slowly moving said compact mass of crystals of uniform cross-section through said filter zone so that said crystals fall out of the open end of said filter zone; recovering said crystals and melting at least a substantial portion thereof in a first melting zone; cooling the resulting melt to a temperature such as to form a slurry of said crystals in mother liquor, said temperature being higher than the temperature of said first mentioned crystal slurry; introducing said crystal slurry formed at said higher temperature into an elongated purification zone; separating mother liquor from said slurry in an upstream portion, with respect to crystal movement, of said purification zone so as to form a mass of crystals therein; moving said mass of crystals through said purification zone toward a second melting zone in the downstream end, with respect to crystal movement, of said purification zone; melting crystals in said second melting zone; displacing a portion of the resulting melt into said moving mass of crystals within said purification zone; and recovering a purified product from said second melting zone.

11. A process for separating a component from a liquid multicomponent mixture, said component forming crystals upon the cooling of said mixture, which comprises introducing said mixture into a first cooling zone and cooling said mixture therein to a temperature such as to form a slurry of crystals in mother liquor; flowing said slurry into an unrestricted elongated filter zone, said zone being normally open at its discharge end; initially obstructing the discharge end of said filter zone so as to prevent said slurry from flowing to the open end of said zone; compressing said slurry within said filter zone so as to squeeze out mother liquor and form a compact mass of crystals of uniform cross-section therein; removing mother liquor from said filter zone; removing the obstruction from the discharge end of said filter zone; slowly moving said compact mass of crystals of uniform cross-section through said filter zone so that said crystals are extruded through the open end of said filter zone; recovering said crystals and melting at least a substantial portion thereof in a first melting zone; passing the resulting melt into a second cooling zone and cooling said melt therein to a temperature such as to form a slurry of crystals in mother liquor, said temperature being higher than the temperature maintained in said first cooling zone; introducing the last mentioned slurry of crystals in mother liquor into a first elongated purification zone; separating mother liquor from said slurry in an upstream portion, with respect to crystal movement, of said first purification zone so as to form a mass of crystals therein; moving said mass of crystals through said first purification zone toward a second melting zone in the downstream end, with respect to crystal movement, of said purification zone; melting crystals in said second melting zone; displacing a portion of the resulting melt into said moving mass of crystals within said first purification zone; recovering a purified product from said second melting zone; passing the mother liquor separated in said first purification zone into a third cooling zone and cooling said mother liquor therein to a temperature such as to form a slurry of crystals in mother liquor, said temperature being lower than that maintained in said second cooling zone but still higher than maintained in said first cooling zone; introducing the last mentioned slurry of crystals in mother liquor into a second elongated purification zone; separating mother liquor from said slurry in an upstream portion, with respect to crystal movement, of said second purification zone so as to form a mass of crystals therein; recycling said mother liquor separated in said second purification zone to said first cooling zone; moving said mass of crystals through said second purification zone into a third melting zone in the downstream end, with respect to crystal movement, of said second purification zone; melting crystals in said third melting zone; displacing a portion of the resulting melt into said moving mass of crystals within said second purification zone; and recovering a purified product from said third melting zone.

12. Apparatus for the separation and purification of crystals which comprises, in combination, a first chiller; feed inlet means connected to said first chiller; an elongated unrestricted tube closed at one of its ends and open at its other end; slurry conduit means connecting the discharge end of said chiller to the closed end portion of said tube; filtering means positioned in an intermediate portion of said tube downstream crystalwise from said slurry conduit means; means disposed in said closed end portion of said tube for compressing crystals within said tube; means for closing the open end of said tube; a container adjacent the open end of said tube for collecting crystals; means for melting crystals in said container; a second chiller; conduit means connecting said container to the inlet end of said second chiller; a crystal purification column; conduit means connecting the discharge end of said second chiller to one end of said column; means for melting crystals in the opposite end of said column and outlet means for withdrawing melt therefrom; means for advancing crystals through said column toward said crystal melting means; and filtering means in said column upstream crystalwise of said crystal melting means.

13. Apparatus for the separation and purification of crystals which comprises, in combination, a first chiller; feed inlet means connected to said first chiller; an elongated unrestricted tube closed at one of its ends and open at its other end; slurry conduit means connecting the discharge end of said chiller to the closed end portion of said tube; filtering means positioned in an intermediate portion of said tube downstream crystalwise from said slurry conduit means; means disposed in said closed end portion of said tube for compressing crystals within said tube; means for closing the open end of said tube; a container adjacent the open end of said tube for collecting crystals; means for melting crystals in said container; a second chiller; conduit means connecting said container to the inlet end of said second chiller; a first crystal purification column; conduit means connecting the discharge end of said second chiller to one end of said first column; means for melting crystals in the opposite end of said first column and outlet means for withdrawing melt therefrom; means for advancing crystals through said first column toward said crystal melting means; filtering means in said first column upstream crystalwise of said crystal melting means; a third chiller; conduit means connecting said filtering means in said first column to the inlet end of said third chiller; a second crystal purification column; conduit means connecting the discharge end of said second chiller to one end of said second column; means for melting crystals in the opposite end of said second column and outlet means for withdrawing melt therefrom; means for advancing crystals through said second column toward said crystal melting means; filtering means in said second column upstream crystalwise of said crystal melting means; and conduit means connecting said filtering means in said second column to said feed inlet means of said first chiller.

References Cited in the file of this patent
UNITED STATES PATENTS

| | | |
|---|---|---|
| 1,135,309 | Meakin | Apr. 13, 1915 |
| 1,940,611 | Strosacker et al. | Dec. 19, 1933 |
| 2,324,869 | Oman | July 20, 1943 |
| 2,632,314 | Vance | Mar. 24, 1953 |
| 2,683,178 | Findlay | July 6, 1954 |
| 2,688,045 | Powers et al. | Aug. 31, 1954 |